(12) United States Patent
Gibson et al.

(10) Patent No.: US 6,601,167 B1
(45) Date of Patent: Jul. 29, 2003

(54) COMPUTER SYSTEM INITIALIZATION WITH BOOT PROGRAM STORED IN SEQUENTIAL ACCESS MEMORY, CONTROLLED BY A BOOT LOADER TO CONTROL AND EXECUTE THE BOOT PROGRAM

(75) Inventors: Ralph E. Gibson, Campbell, CA (US); Loren J. Shalinsky, Mountain View, CA (US); Mark A. McClain, San Diego, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/483,318

(22) Filed: Jan. 14, 2000

(51) Int. Cl.[7] ............................................. G06F 9/445
(52) U.S. Cl. ................................................ 713/2; 713/1
(58) Field of Search ........................................ 713/1, 2

(56) References Cited

U.S. PATENT DOCUMENTS

| | | | |
|---|---|---|---|
| 5,379,431 A | * | 1/1995 | Lemon et al. ............... 395/700 |
| 5,664,194 A | | 9/1997 | Paulsen ....................... 395/712 |
| 5,799,186 A | | 8/1998 | Compton ..................... 395/652 |
| 5,940,627 A | * | 8/1999 | Luciani et al. ............... 395/834 |
| 5,951,685 A | * | 9/1999 | Stancil .......................... 713/2 |
| 5,987,605 A | * | 11/1999 | Hill et al. ....................... 713/2 |
| 6,446,139 B1 | * | 9/2002 | Leung et al. .................. 710/1 |
| 2001/0052067 A1 | * | 12/2001 | Klein ............................ 713/1 |

* cited by examiner

Primary Examiner—Thomas Lee
Assistant Examiner—Nitin C. Patel

(57) ABSTRACT

A computer system includes a processor and a sequential access memory having a boot program stored therein. A boot loader includes a state machine which, in response to initialization of the computer system, controls the sequential access memory to read the boot program and then controls the processor to jump to the boot program in the sequential access memory. The first memory page of the boot program causes further boot code to be transferred to a Random Access Memory (RAM). The processor then jumps to the code in the RAM, which causes the remainder of the boot code to be transferred from the sequential access memory to the RAM and executed.

38 Claims, 7 Drawing Sheets

COMPUTER SYSTEM INITIALIZATION WITH BOOT PROGRAM STORED IN SEQUENTIAL ACCESS MEMORY, CONTROLLED BY A BOOT LOADER TO CONTROL AND EXECUTE THE BOOT PROGRAM

BACKGROUND OF THE INVENTION

1. Field of the Invention

The present invention generally relates to the art of electronic digital computers, and more specifically to a computer system in which boot code is stored in a sequential access memory.

2. Description of the Related Art

A conventional digital computer system includes a non-volatile Read Only Memory (ROM) which contains boot code instructions. This boot program code is used to set up the low level hardware functions of the system prior to the operating system or application programs being given control of the system.

The Central Processing Unit (CPU) of the system, which is typically a micro-controller or microprocessor, is configured to jump to a predetermined memory address in the ROM and begin executing the boot code upon initialization (including powering up or resetting) of the system. The boot code causes an operating system or startup application program to be loaded and executed.

A boot code ROM is typically a random access memory in which an instruction or data at any address can be accessed directly and independently. This supports the branching behavior of most programs in which an instruction following a branch can be read from any arbitrary location in the memory. These memories are also ready to read very shortly after power is supplied.

Sequential access memories have been developed which have advantages and disadvantages relative to random access memories. In a sequential access memory, individual addresses are not accessible directly. The memory is organized in pages of, for example, 512 bytes each, and it is necessary to read out an entire page or half page in order to obtain the code stored at any particular address on the page.

A sequential access memory that can be advantageously utilized to practice the present invention is the Am30LV0064D UltraNAND™, which is commercially available from Advanced Micro Devices, Inc. (AMD) of Sunnyvale, Calif. This memory is a Flash ROM device based on NAND architecture.

Compared to sequential access non-volatile memories, random access ROMs require more physical pins and connections, mainly for address lines, cost significantly more for the same bit density, and are not available in as high a density as sequential access memories.

Sequential access memories, on the other hand, generally require a command sequence to be written to the device in order to select and make a set of information readable, and thus are not ready to read immediately following power being supplied. They can only read information from sequential locations in the memory until a new command sequence is written, and thus only support straight line program execution.

In computer systems where the higher density and lower cost benefits of non-volatile sequential memory are desired, it has been previously necessary to also provide a non-volatile random access memory to, at a minimum, support initial program execution, also known as booting up the system. Initial program execution must occur in the non-volatile ROM at least until the sequential access memory has been set up for reading and programs in the sequential access memory can be transferred to volatile Random Access Memory (RAM) for execution.

As described above, a sequential access memory is lower in cost and higher in storage density than a random access memory. For a system in which a sequential access memory is the preferred type of memory to be used, it is desirable to eliminate the need for a separate non-volatile random access memory for support of initial program execution in order to lower the system cost and size. However, the ability to provide this functionality has not been achieved in the past.

SUMMARY OF THE INVENTION

In view of the above, the present invention provides a computer system in which initial program execution is performed using only a sequential access memory, thereby eliminating the need for a separate non-volatile random access memory.

This is achieved in a computer system according to the present invention, which includes a processor, a sequential access memory having a boot program stored therein, and a boot loader. The boot loader includes a state machine, which in response to initialization of the computer system controls the sequential access memory to read the first page of sequential memory containing a first portion of the boot program. The first portion of the boot code is created with the understanding that the sequential memory can only deliver sequential words of memory to the processor. The first portion of the boot code instructs the processor to copy a second portion of the boot code into volatile RAM. Once the second portion of the boot code is copied into RAM, the first portion of the boot code executes a branch (jump) instruction that transfers control to the second portion of the boot code that is in RAM. The second portion of the boot code is then able to take advantage of the random access nature of the RAM memory that allows for normal code execution, including jumps within the boot code in RAM. The second portion of the boot code is able to cause the appropriate commands to be sent to the sequential memory in order to transfer into RAM any other code that is needed.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
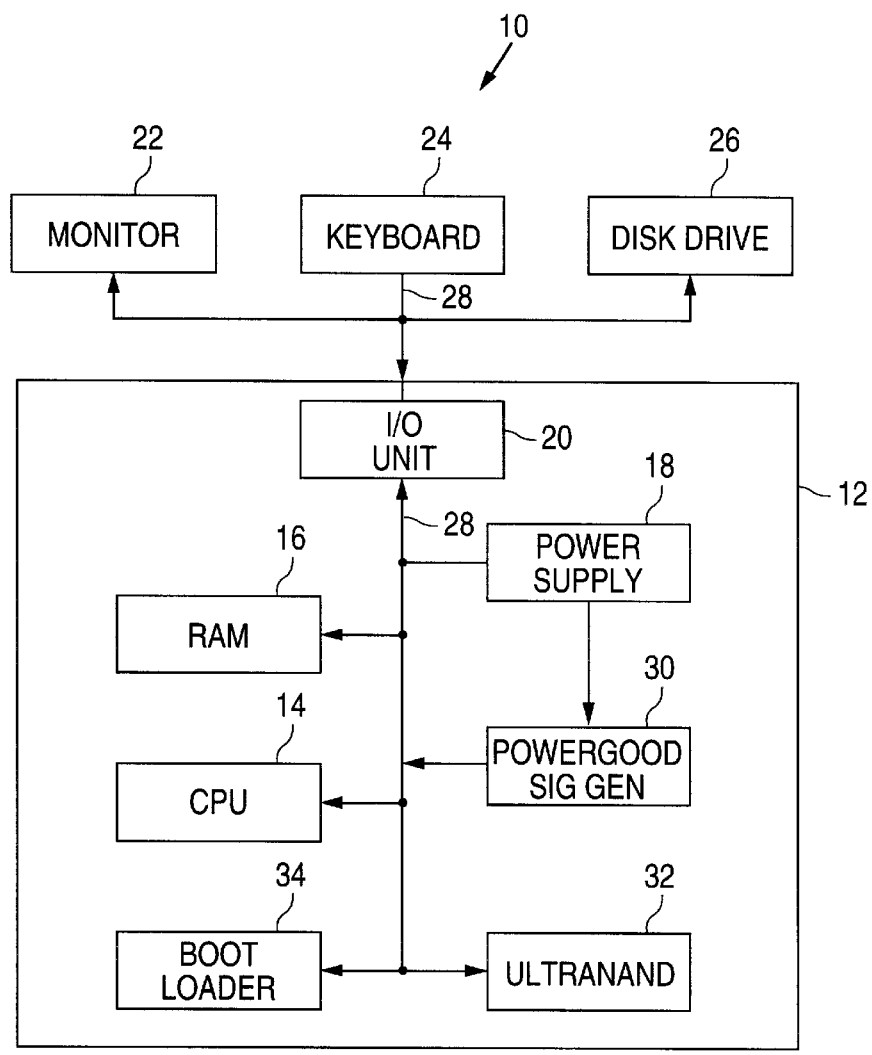
FIG. 1 is a simplified block diagram illustrating a computer system according to the present invention.

FIG. 1 illustrates a computer system 10 according to the present invention, which includes a motherboard 12. A processor or Central Processing Unit (CPU) 14, also known as a micro-controller or microprocessor, a volatile Random Access Memory 16 and a power supply 18 are operatively provided on the motherboard 12 in a conventional manner. An Input/Output (I/O) unit 20 provides interconnection of the motherboard 12 to typical I/O devices such as a display monitor 22, keyboard 24 and one or more disk drives 26. These components are interconnected by signal busses, power lines, connectors, etc. as collectively indicated at 28.

In accordance with the present invention, the system 10 further includes a power-good or reset signal generator 30, which produces a PWRGOOD (or RESET) signal after the power supply 18 has been turned on and the operating voltages have reached their proper levels. The system 10 further includes a sequential access memory 32 and a boot loader 34.

The memory 32 is preferably an UltraNAND™ memory, which is commercially available from Advanced Micro Devices (AMD) of Sunnyvale, Calif. The memory 32 shown in this example is a Am30LV0064D UltraNAND™ Flash Electrically Erasable Programmable Read Only Memory (EEPROM) device based on NAND architecture, and is capable of storing 64 megabits of data. The data is stored in 16,384 memory pages, with each page containing 512 bytes of regular data and 16 bytes of spare data. In accordance with the invention, the memory 32 stores boot code instructions beginning in its lowest memory page which are initially executed upon initialization (power up or reset) of the computer system 10. No non-volatile RAM is provided for this purpose.

Figures 2, 3:
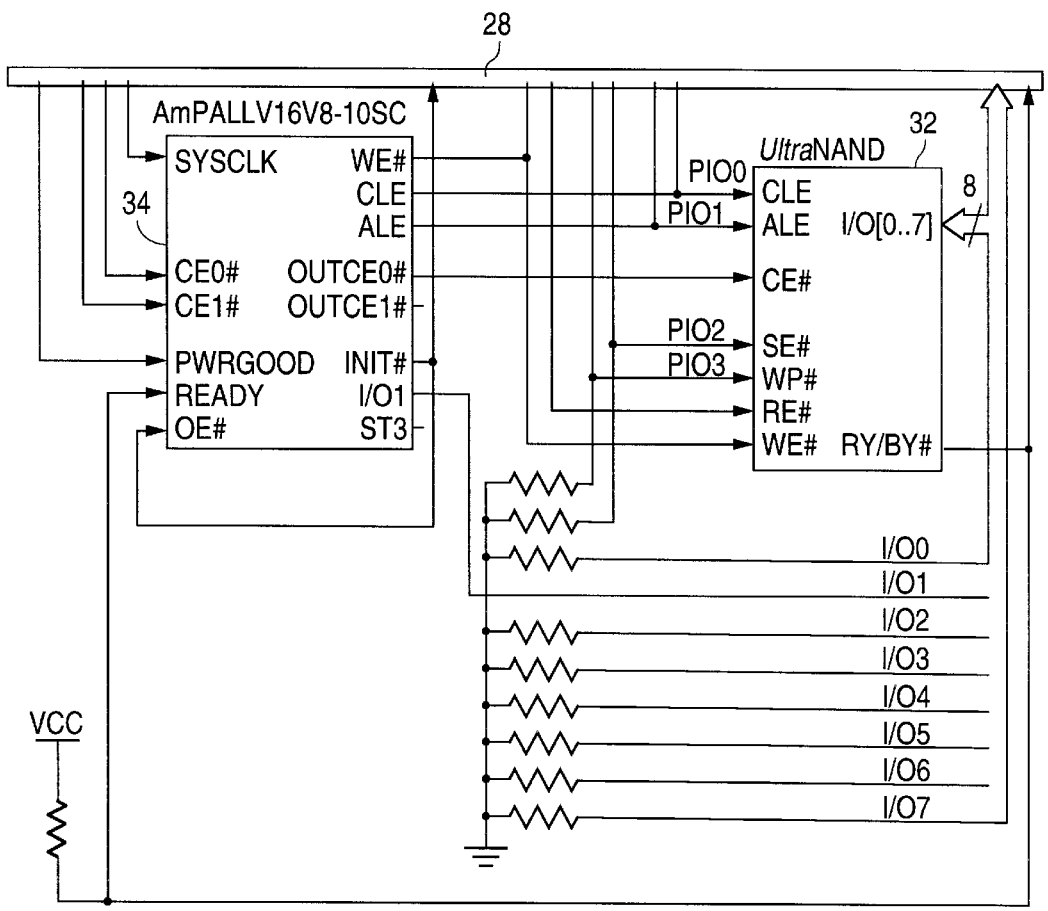
FIG. 2 is an electrical schematic diagram illustrating a boot loader and sequential access memory of the computer system of FIG. 1.
FIG. 3 is a pin diagram of the boot loader.

The boot loader 34 and memory 32 are illustrated in FIG. 2, with a pinout diagram of the boot loader 34 being shown in FIG. 3. The boot loader 34 is preferably an AmPALLV16V8-10SC Programmable Logic Device (PLD) which is commercially available from the Vantis Corporation of Sunnyvale, Calif. The detailed configuration and operation of the memory 32 and boot loader 34 will be presented below.

Figure 4:
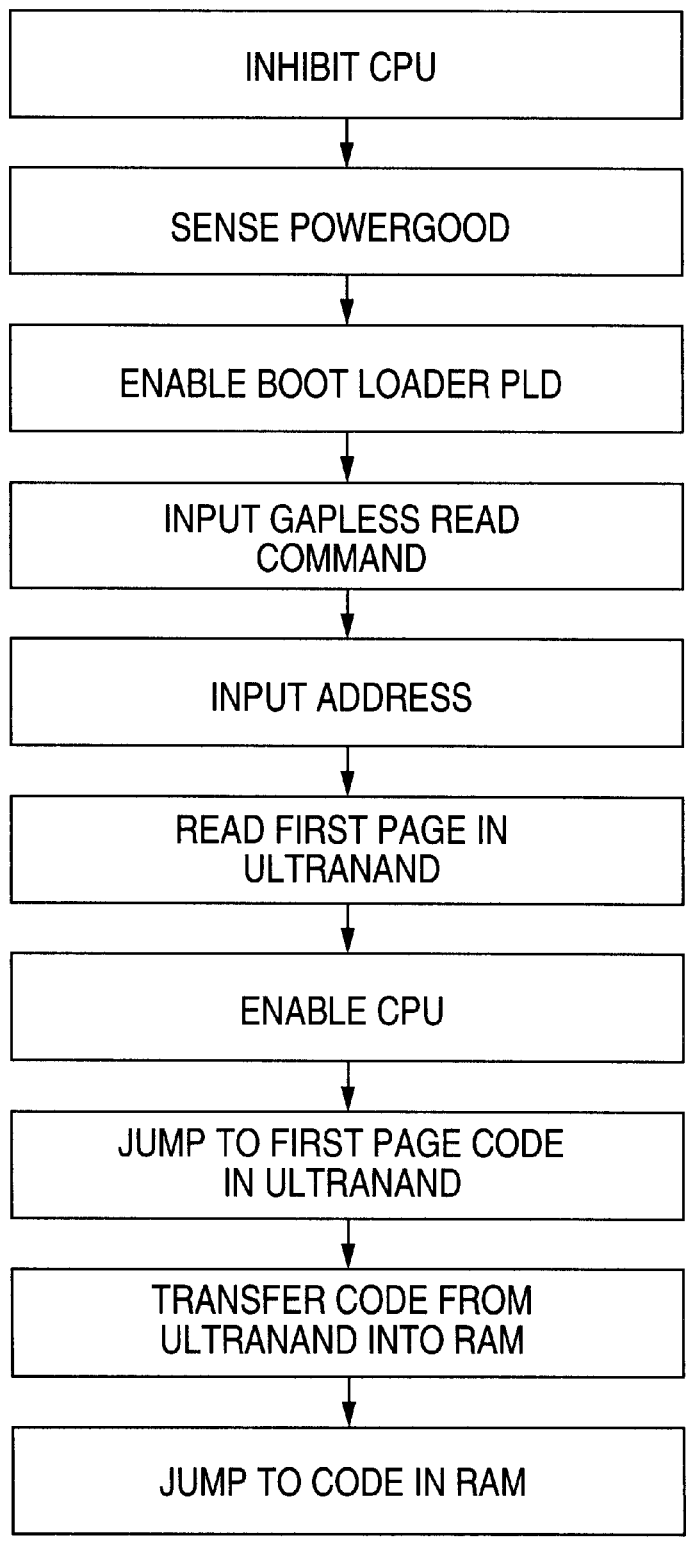
FIG. 4 is a flowchart illustrating a method of the present invention.

FIG. 4 is a flowchart illustrating a bootstrap loading method according to the present invention, which is performed by the system 10. Upon initialization, the boot loader 34 inhibits the processor 14 and thereby prevents it from attempting to execute instructions. The boot loader 34 senses the status of the PWRGOOD signal and becomes enabled when the PWRGOOD signal indicates that the power supply 18 is generating the proper operating voltages.

The boot loader 34 has an internal state machine implemented therein by programmed logic. The memory 32 requires setup commands to be written to it before it is able to read data. The state machine in the boot loader 34 generates these setup commands and writes them to the memory 32. First, the unit 34 writes a read command into a command latch of the memory 32. The boot loader 34 then writes an address into an address latch of the memory 32.

For this example a Gapless-read command is used. The Gapless-read command is a superset command of the UltraNAND memory 32, which enables it to output multiple memory pages sequentially. A normal read command is also available which reads a single page at a time and has a 7 µs latency period associated as each page is loaded into a 528 bit output data register. The Gapless-read command eliminates the inter-page latency and there is only a single 7 µs latency period as the first page is loaded. This allows the boot code to span multiple memory pages without the need for any further read commands to the memory. The address, which the boot loader 34 loads into the address latch of the memory 32, is the address of the first page in the memory 32. However, the normal read command can alternatively be used within the scope of the invention.

In the next step, the UltraNAND memory 32 reads the first page of boot code from its internal structure into its output data register and indicates the completion of the page read operation by setting its Ready/Busy (RY/BY#) signal to the Ready state. The boot loader 34 state machine then enables the processor 14 to proceed with instruction execution by making the INIT# inactive. A conventional state machine or hard microcode is provided in the processor 14 which causes it to jump to a predetermined address where the processor expects to find boot code in the system. The system will decode this address so as to select the memory 32. The processor will begin reading and executing boot code instructions from the memory page in the output data register of the memory 32.

Note that the processor will accept whatever data is provided by the memory as boot code instructions. The boot code address presented by the processor is ignored by the memory. This means that the same first memory page is used for any processor, independent of whether the processor uses a low or high value address to select boot code. However, the boot code must be aware of the address used by the processor to select boot code. In the case of a processor that uses a high memory address for the first words of boot code, the code must include a jump instruction that will change the processor address to a lower address. That address must still be within the address range that is decoded by the system to select the memory 32. Without the jump instruction such a processor could increment its address to the point that it would wrap around to a low memory address that would no longer select the boot memory 32. The actual address used is not critical, since the UltraNAND device will simply deliver a sequential stream of instructions that is independent of the address bus. However, the jump destination address must be far enough below the top of memory to keep the address within the memory 32 address space until this first portion of boot code jumps to the second portion of boot code that is copied to RAM memory.

The boot code must also be aware of how the processor fetches instructions. Many processors have an instruction fetch state machine that reads instructions into a buffer ahead of the actual use of instructions by the instruction execution state machine of the processor. This is often referred to as the prefetching of instructions. When a jump instruction is executed, prefetched instructions will be ignored. Any instructions that have been prefetched, and placed in the prefetch buffer, are not executed when the jump instruction changes the address from which the next instruction is to be executed. This is important because the sequential access memory is ignoring the processor address. The sequential address memory simply delivers the next word from memory, each time a read of memory is done. Since an instruction prefetch state machine could take several words from the memory before a jump instruction executes and clears the prefetch buffer, the boot code must be aware of how many words of memory could be discarded by the jump instruction. The next instruction that must execute after the jump must not be in the range of locations following the jump instruction which could be cleared from the prefetch buffer. If the precise number of words that must be skipped can not be predicted, the code will need to include enough No-operation (NOP) instructions following the jump instruction so as to ensure that the instruction to follow the jump can not be discarded. Any portion of NOP instructions following the jump can be safely executed until the next valid instruction is reached in the code. The exact number of NOP instructions fetched and later cleared from the prefetch buffer will not matter or interfere with the remaining code execution.

After dealing with any adjustments to the instruction fetch address as just described, the next task is to copy the second portion of the boot code to RAM. The next instructions of boot code preferably cause a "string copy" operation which results in a sequential group of the immediately following words in the memory 32 being copied into an Execute in Place (XIP) volatile random access memory. This group of words is the second portion of boot code that is embedded within the first portion of boot code. The XIP memory can be the RAM 16 or can alternatively be a cache or other memory in the processor 14.

Again, because some processors perform instruction prefetching, it may necessary to insert NOP instructions between the string read instruction and the beginning of the second portion of boot code. This is to ensure that none of the second portion of boot code can be taken into the prefetch buffer before the string copy begins reading words from the memory. It may not be possible to predict the beginning boundary between words already in the prefetch buffer and words first copied by the string copy instruction. Therefore, the end of the string to be copied must be followed by additional NOP instructions and the length of the copy must ensure that all of the second portion of boot code will be copied. The string copied may thus include some of the beginning or ending NOP instructions. The NOP instructions will not affect the operations performed by either the first or second portions of the boot code. But, they make the boundary flexible between the instructions executed and the string copied.

Since the exact alignment of the code within the string copy may not be known, it is necessary to use relative branches within the portion of the bootstrap program that is loaded into XIP memory.

It is also possible to use a series of move immediate instructions in order to assemble the second portion of boot code in the XIP memory. This would give more control over code alignment. However, it makes the boot code larger and more difficult to create since the second portion of the boot code must be converted from a stream of instructions into a stream of move immediate instructions where the data being moved is the image of the second portion of boot code.

After the second portion of boot code has been stored in the XIP memory, the last instruction of the first portion of boot code, which is executed from the memory 32, causes the processor 14 to jump to an address in the XIP memory. The processor then starts executing the second portion of boot code that has been copied from the memory 32. This is a bootstrap process, which can be continued in several stages. The first stage is the boot code that is executed from the sequential access memory 32. The next and any subsequent stages involve additional blocks of initialization code that are copied from the memory 32 into the XIP memory and then jumped into for execution. Although not explicitly illustrated, the bootstrap process will typically also proceed to load and launch an operating system from a hard drive, and possibly one or more application programs.

Figure 8:
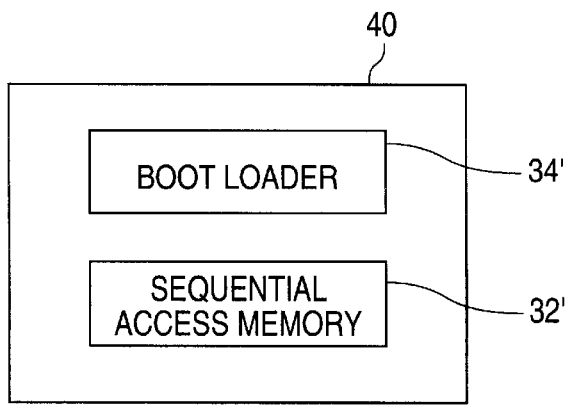
FIG. 8 is a simplified block diagram illustrating a boot loader and sequential access memory implemented in a single integrated circuit.

Preferably, the state machine and associated functionality of the boot loader 34 can be implemented together with the sequential access memory within a single integrated circuit 40 as indicated at 32' and 34' in FIG. 8. This can be accomplished, for example, by adding sufficient logic circuitry to the sequential access memory to perform the required boot loader function. This embodiment is simpler and requires less device modification than integrating some small portion of random access memory with the sequential memory. This is because the state machine does not require any additional process steps or additional address pins. The UltraNAND or other sequential access memory can remain pin compatible with other memories of similar type.

The following description sets forth the detailed functionality of the present invention.

Overview

The UltraNAND product line has been developed by Advanced Micro Devices, Inc. (AMD) to address high-density non-volatile memory needs. Target applications include code and data storage in embedded or removable media systems. The following detailed description presents a Boot Loader PLD for use with an UltraNAND memory.

Micro-controller based systems generally have Programmable Input/Output (PIO) pins available which can be used to directly provide the UltraNAND control signals. Where these PIO pins are not available some additional interface logic may be required for an appropriate connection between the processor, boot loader and sequential memory. The boot loader PLD can be designed into a single AmPALLV16V8-10SC chip and is intended to support code storage applications that need to boot directly from the UltraNAND device following power-up.

Code Storage Related Benefits of UltraNAND

UltraNAND has been designed to be fully hardware and software compatible with NAND architecture flash memories already available on the market. However, UltraNAND has been designed as an improved product, providing 100,000 program/erase cycle endurance without requiring Error Correction Circuits (ECC). UltraNAND is also available with 100% good blocks, which eliminates the need for bad block mapping.

The lower cost per bit (than NOR Flash), increased program/erase cycle endurance without ECC, and availability of 100% good devices, makes UltraNAND ideally suited for code storage applications. Especially, where system code is stored in UltraNAND flash memory and is transferred, or shadowed, to a high-speed memory resource, like synchronous DRAM, for fast random access or execution.

The Boot Loader PLD

For code storage applications that need to boot directly from UltraNAND, a boot loader of some type is required for UltraNAND initialization. This is because, following power-up, the UltraNAND data registers do not contain valid information. The present boot loader PLD 34 holds the processor off the bus and provides the control signal sequences needed to initialize up to two UltraNAND flash devices.

The initialization process issues the AMD superset Gapless Read command (02h) to each of the UltraNAND devices to pre-load the first flash memory page, containing boot code, into the internal UltraNAND data registers. This allows the system micro-controller or processor 14 to read and execute sequential system boot code from the memory 32 following power-up. For code storage applications, the system micro-controller can boot out of the UltraNAND device 32, and then transfers the remainder of the code stored in UltraNAND to RAM for code execution. Since code may be executed from the RAM memory it is also referred to as Execute-in-Place (XIP) memory.

UltraNAND Interface Requirements for Boot Access

The UltraNAND memory 32 utilizes a multiplexed address/data bus. All command, address, and data information is passed to and from the device through I/O[0 . . . 7] (the eight bit I/O port). Control signals are provided on the device for CE# (Chip Enable), CLE (Command Latch Enable), ALE (Address Latch Enable), WE# (Write Enable), SE# (Spare Area Enable), and WP# (Write Protect). There is also an open drain RY/BY# (Ready/Busy) output pin used to indicate when the device is busy with an internal operation.

System applications using UltraNAND must generate the proper control signals for the device which, in many cases, are not used by any other system resource. The boot loader PLD 34, described here, provides all of the unique signals required by UltraNAND memory 32 for device initialization.

In order to transfer a page of information contained in the UltraNAND device to the internal data registers, a command and address sequence must be performed. Following the command and address input, the UltraNAND device will transfer information from the appropriate flash page to the data registers within a 7 $\mu$S (worst case) read latency period, during which the device will appear busy. Once the non-volatile page of information has been successfully transferred to the data registers, the UltraNAND device will go ready and the system can read valid information, sequentially, from the flash device 32 at a maximum rate of 50 nS per byte.

System Interface Description

The boot loader PLD unit 34 supports a single UltraNAND device 32 in this example. The boot loader PLD temporarily becomes the source of the usual system control signals required by the UltraNAND flash during the boot loading process. The boot loader PLD is then able to generate the signal sequence required for UltraNAND initialization.

The power-good signal generator 30 provides a PWRGOOD input signal to the boot loader PLD 34, which remains low until $V_{CC}$ is valid. When PWRGOOD transitions from an invalid (low) state to a valid (high) state, the boot loader PLD 34 detects that transition and initializes the UltraNAND device 32.

In some applications where a PWRGOOD signal is not available, a system RESET# signal may be used instead. The INIT# (initializing) signal generated by the boot loader PLD is used to indicate that the boot loader 34 is busy initializing the UltraNAND device 32. The system 10 must monitor the INIT# signal and hold the system micro-controller 14 off the bus until INIT# becomes invalid (high). Once INIT# indicates that the UltraNAND boot process is complete, the system 10 can allow the micro-controller 14 to read information from the UltraNAND device.

In many cases the INIT# signal can be used as the Reset signal to the rest of the system 10. The usual system RESET# signal goes only to the boot loader 34 and the boot loader uses the INIT# signal to hold the rest of the system 10 in the Reset state until the UltraNAND device 32 is ready to be read.

During the address phase of the boot loader process, address bytes will be written to UltraNAND until the device goes busy. This allows the boot loader 34 to support devices that require three or more address pulses. Following the boot loader initialization process, the boot loader tri-states WE#, CLE, ALE, and I/O1 and passes CE0# and CE1# from the system bus 28 to the UltraNAND device(s).

Boot Loader Signal Description

Figure 6:
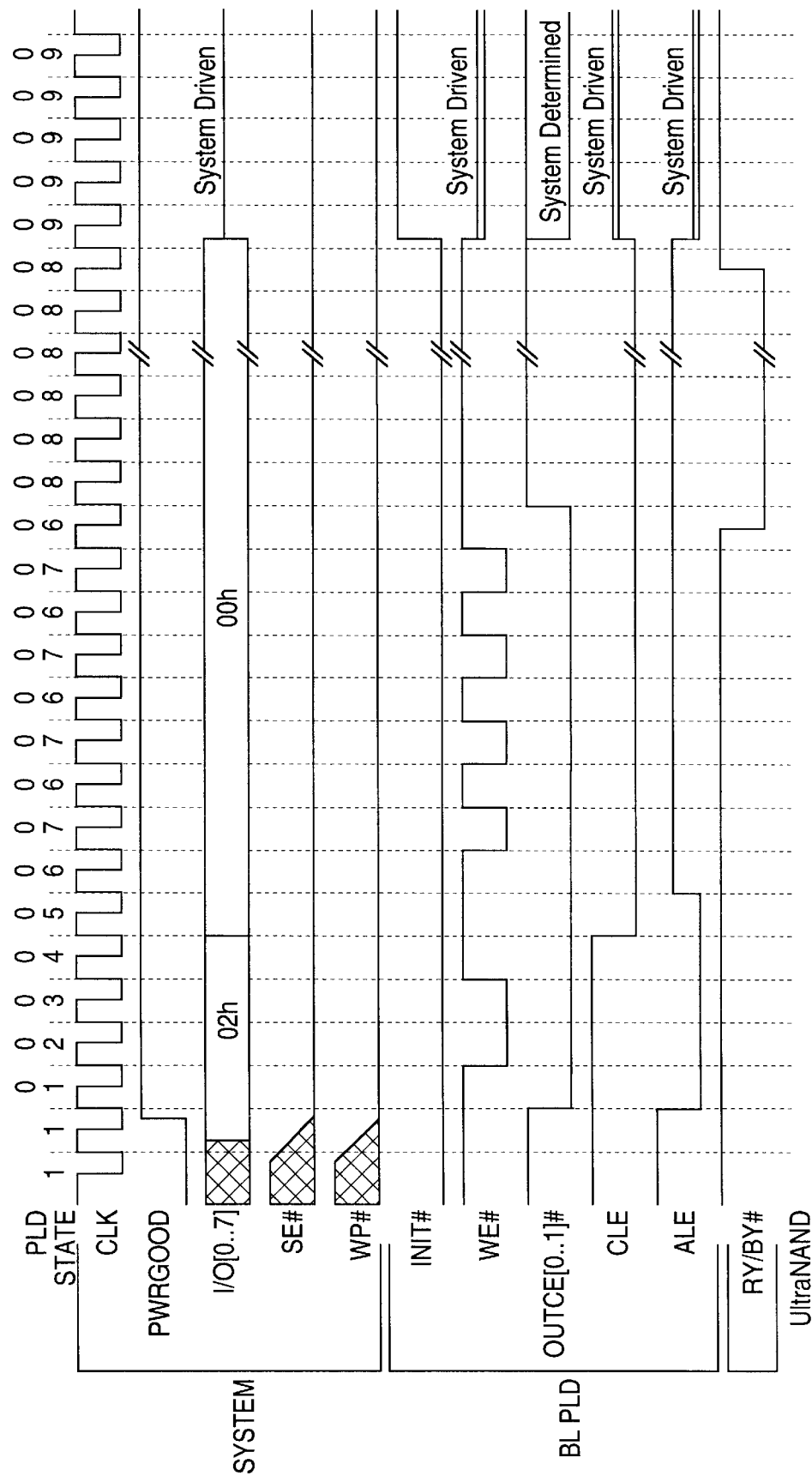
FIG. 6 is a timing diagram of the present system.

The UltraNAND boot loader 34 generates all of the signals required to initialize one or two UltraNAND devices with a Gapless Read command sequence. A simple state machine in the PLD 34 controls INIT#, WE#, CLE, ALE, and I/O1 to control the UltraNAND initialization. In order to start the boot loader PLD, the system needs to provide SYSCLK (System Clock) and PWRGOOD (a Power Good indicator). The definition of all pertinent signals and the source required to generate the signals are listed in the table below. A timing diagram of the boot loader initialization sequence is shown in FIG. 6.

| SIGNAL | SOURCE | DEFINITION |
|---|---|---|
| ALE | Boot Loader/System | Tri-state Address Latch Enable for UltraNAND address cycles |
| CLE | Boot Loader/System | Tri-state Command Latch Enable for UltraNAND command cycles |
| WE# | Boot Loader/System | Tri-state write signal used to initialize UltraNAND during boot |
| INIT# | Boot Loader | Indicates that the boot loader PLD is initializing UltraNAND |
| I/O [0 . . . 7] | Boot Loader/System | The I/O lines used to transfer command and addresses to UltraNAND |
| ST3 | Boot Loader | The unused most significant state machine output from the PLD |
| OE# | Boot Loader | Must be tied to INIT# to enable PLD registered outputs |
| OUTCE [0 . . . 1]# | Boot Loader | The Chip Enable outputs from the PLD to the UltraNAND devices |
| CE [0 . . . 1]# | System | The Chip Enable decode signals from the system for UltraNAND |
| PWRGOOD | System | Power Good signal which remains low until VCC is valid |
| SYSCLK | System | System clock required by the boot loader state machine |
| READY | UltraNAND | Connects to the RY/BY# signal to indicate the UltraNAND's state |

Boot Loader PLD Theory of Operation

Figure 7A:
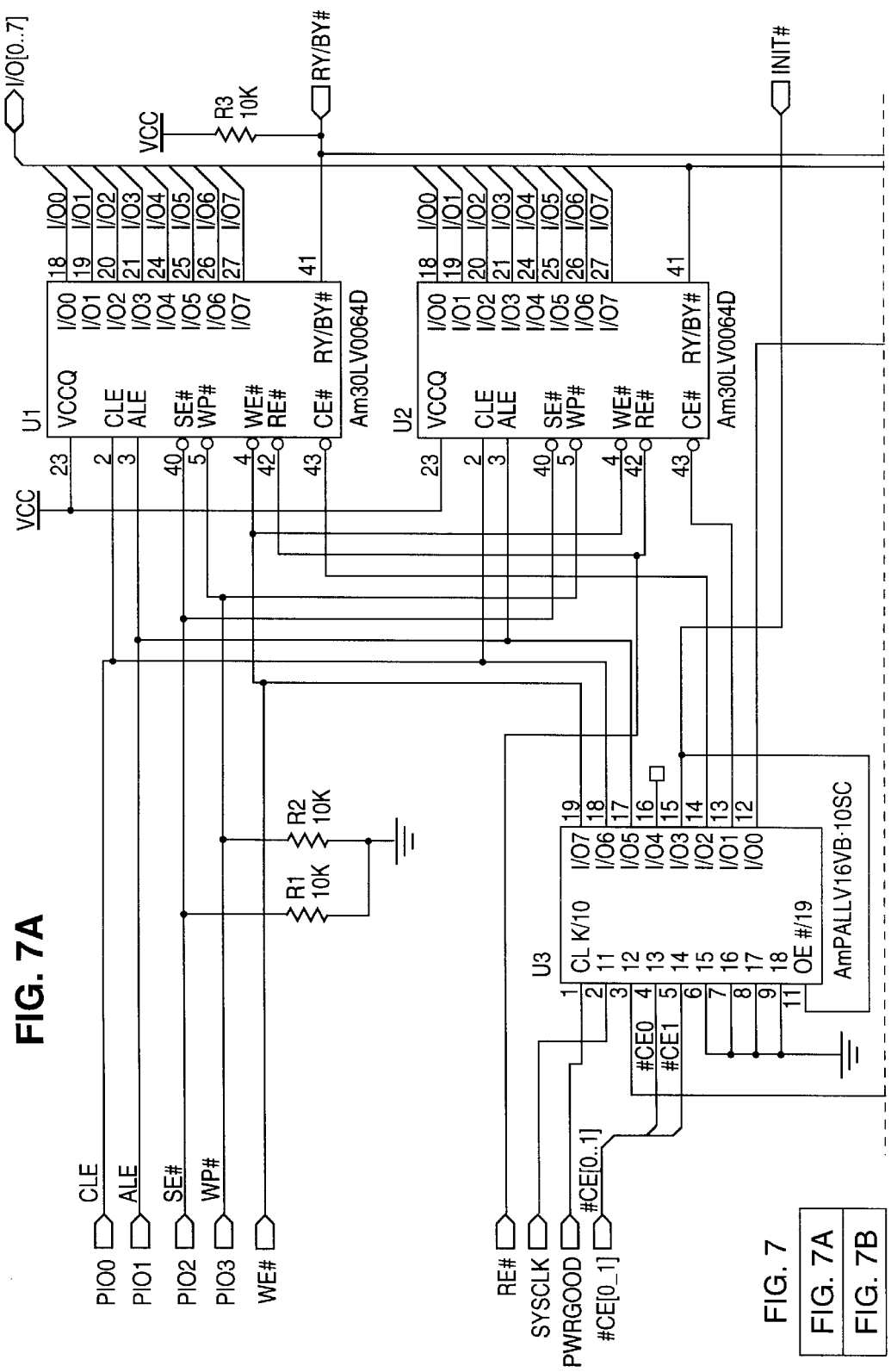
FIG. 7 is a more detailed electrical schematic diagram of the boot loader and sequential access memory.
Figure 7B:
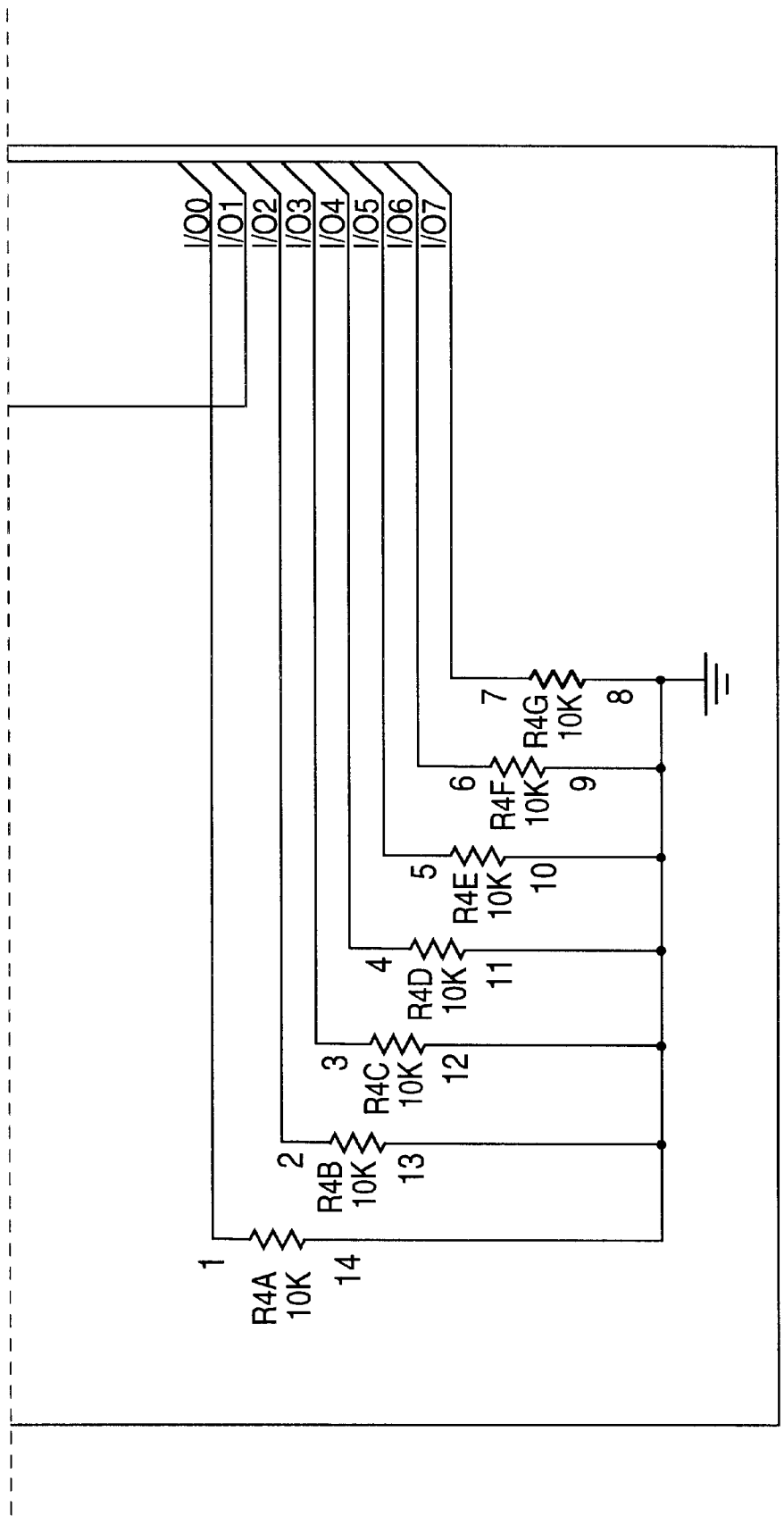

In this section, the boot loader PLD 34 design and operation will be described. The boot loader PLD 34 uses flip-flops for the state machine and I_O1. Combinatorial logic is used to generate all other signals required to control up to two UltraNAND 32 devices. The device reference designators used in this section can be found in FIG. 7, an example schematic of a "Typical Boot Loader Application Supporting Two UltraNAND Devices".

Output Signal Generation

INIT# is a combinatorial output that is used to inform the system that the boot loader PLD 34 is in the process of initializing the UltraNAND 32 array. While INIT# is active, the system 10 must hold tri-stated the system signals (such as address lines or PIO pins) which are used during normal system operation to drive the UltraNAND CLE, ALE, WE#, and I/O[0 . . . 7] signals. In many cases the INIT# signal can be used as the reset signal to the other system components since the reset state will often hold processor outputs in a tri-state condition.

During the INIT# period the PLD 34 drives the command and address information onto the UltraNAND 32 data bus, and controls CLE, ALE, and WE# as needed for UltraNAND initialization. During the command phase, with CLE active, I_O1 is used to drive a 02h value onto the UltraNAND 32 data bus to write the Gapless Read command to UltraNAND 32. During the address phase while CLE is inactive and ALE is active, a 00h value is driven onto the UltraNAND 32 data bus.

This allows the boot loader PLD 34 to load the address for block 0, page 0, byte 0 into the UltraNAND 32 device to allow the system to read from the first byte following initialization. During INIT#, the PLD 34 activates the output chip enables regardless of the state of the chip enable inputs. This allows the boot loader PLD 34 to initialize up to two UltraNAND 32 devices in parallel during the boot loader operation.

I_O1 is a tri-state registered output, which is used to write the Gapless Read command (02h) to the UltraNAND 32 devices during the boot loader PLD 34 initialization phase. While INIT# is active the system is required to hold the UltraNAND 32 data bus, I/O[0 . . . 7] tri-stated. With the pull-down resister pack, R4, holding all other data bits low, I_O1 can then drive high during the command phase to write a 02h op-code to UltraNAND 32. During the address phase, I_O1 is driven low so all of the address cycles write a 00h value into the UltraNAND 32 address registers. OUTCE[0 . . . 1]# are the two chip enable outputs required to enable the UltraNAND 32 devices.

The chip enables are forced active during the INIT# period for boot loader activity. Once INIT# goes inactive (high), the chip enable outputs are determined by the chip enable inputs. ST[0 . . . 3] are four tri-state registered state bits used to define up to sixteen states of the state machine, of which 9 states are actually used. These bits are actively driven during the period that INIT# is active, and are tri-stated when INIT# goes inactive.

Three of the state bits are used to define WE# (ST0), CLE (ST1), and ALE (ST2). The state machine in the boot loader PLD 34 is a typical Mealy machine with the PLD outputs dependent on the current state and input conditions. The AmPALLV16V8-10SC device 34 powers up with all registered outputs in the high state. Therefore, the state machine defines the IDLE state as an all ones output condition.

Figure 5:
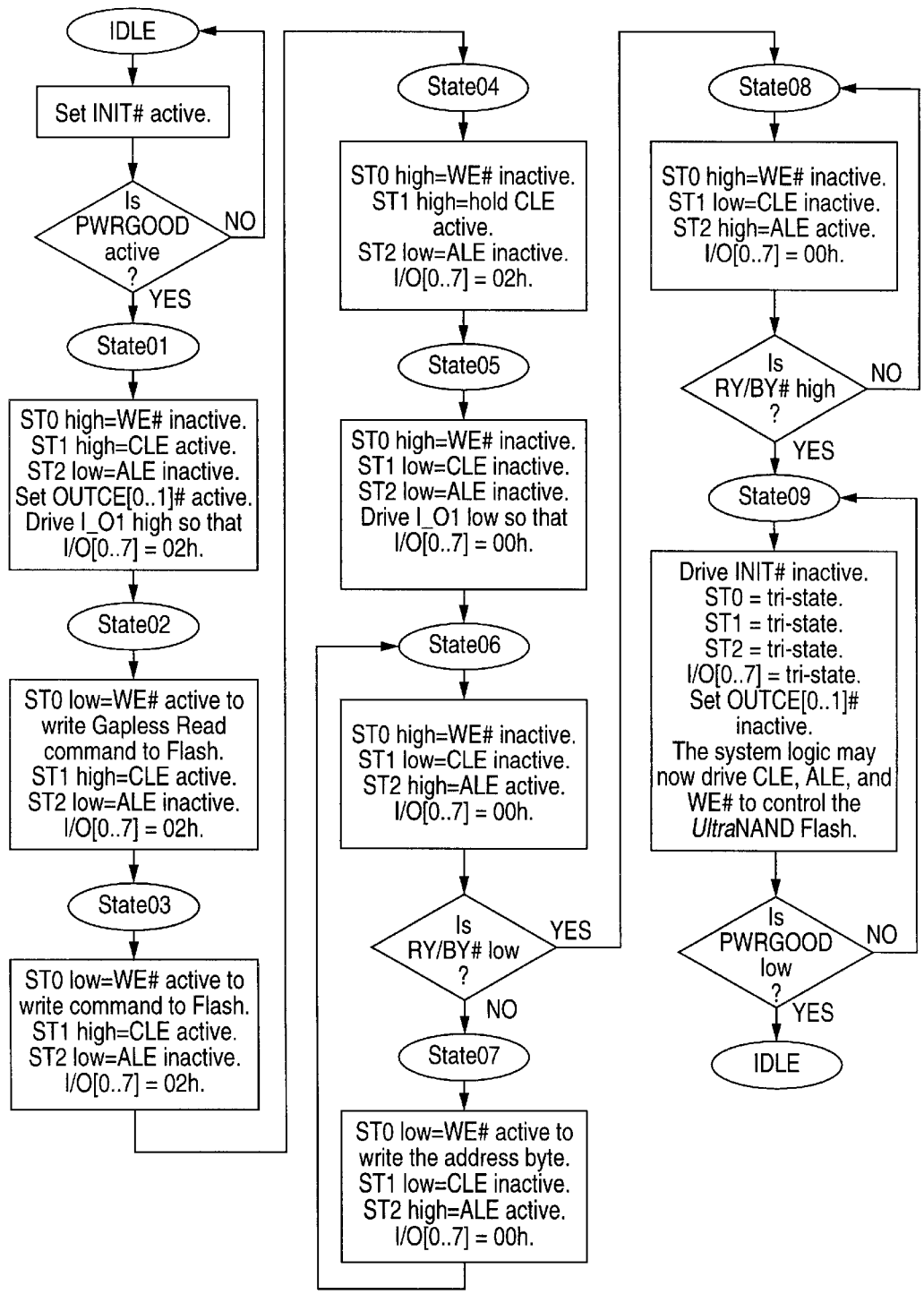
FIG. 5 is a state diagram of a state machine of the boot loader.

State01 through State09 are gray coded variations to eliminate noise pulses in combinatorial outputs, and avoid race conditions due to asynchronous inputs. The state machine flow chart is shown in FIG. 5.

ST0, as WE#, is used to write information to the UltraNAND Flash during initialization. The system is required to hold the system WE# input to UltraNAND 32 tri-stated during the initialization period. Once initialization is complete, the boot loader PLD 34 will tri-state its WE# output and the system 10 can then drive WE# as required.

ST1, as CLE, is used to enable command writes to the UltraNAND Flash 32 during initialization. The system is required to hold the system CLE input to UltraNAND 32 tri-stated during the initialization period. Once initialization is complete, the boot loader PLD 34 will tri-state its CLE output and the system 10 can then drive CLE as required.

ST2, as ALE, is used to enable address writes to the UltraNAND Flash 32 during initialization. The system is required to hold the system ALE input to UltraNAND tri-stated during the initialization period. Once initialization is complete, the boot loader PLD 34 will tri-state it's ALE output and the system 10 can then drive ALE as required.

Other Signals

CE[0 . . . 1]# are the two chip enable input signals generated by the system 10 to select the UltraNAND 32 devices. During the initialization process, the CE[0 . . . 1]# inputs are ignored by the boot loader PLD 34, and OUTCE[0 . . . 1]# are driven active to select the UltraNAND 32 devices used. Once initialization has been completed, the boot loader PLD 34 simply passes the system 10 CE[0 . . . 1]# signals on to the UltraNAND 32 devices via the OUTCE[0 . . . 1]# outputs.

PWRGOOD is a system generated signal that is used to indicate when the boot loader PLD 34 should initialize the UltraNAND 32 flash devices. PWRGOOD is held de-asserted (low) during power up until $V_{CC}$ is valid. When power is applied to the boot loader PLD 34, the state machine comes up in the IDLE state, where it will remain until PWRGOOD goes active (high). Once a low to high transition is detected on PWRGOOD, by the boot loader PLD 34, the PLD 34 will proceed to initialize the UltraNAND flash memory 32.

For systems that do not have a PWRGOOD signal available, the system RESET# signal will generally perform the same function. When RESET# goes active (low) to reset the system, the boot loader state machine will enter the IDLE state. When RESET# becomes inactive (high) the boot loader will then initialize the UltraNAND 32 devices.

RY/BY# is generated by the UltraNAND 32 device to indicate when the device is busy with an internal operation. The system 10 may use the RY/BY# hardware signal, or poll the RY/BY# status bit in the status register, to determine when an operation is in process, or has completed. The boot loader PLD 34 monitors the RY/BY# signal, via the READY input, to determine when the UltraNAND flash 32 has completed the transfer of information from the internal flash array to the internal data registers. At that time the memory 32 is initialized and control can be turned over to the system 10.

SYSCLK is required by the boot loader PLD 34 to drive the device state machine. Since the UltraNAND 32 has a minimum write pulse width specification of 25 nS, the maximum frequency for SYSCLK is 40 MHz.

Boot Loader State Machine

In the boot loader PLD 34, a simple state machine is used to perform the UltraNAND initialization. The boot loader state machine drives the boot loader PLD 34 outputs, to provide the appropriate signals needed to initialize one or two UltraNAND devices 32. A flow chart of the boot loader PLD state machine is shown in FIG. 5.

Implementation Details

With the boot loader PLD described herein, the PLD has the ability to initialize up to two UltraNAND devices upon power-up. There are a few basic system interface considerations that must be taken into account when using the boot loader PLD.

Tri-State Control of CLE, ALE, WE#, and I/O[0 . . . 7]

During the period following power-up while the boot loader PLD is initializing the UltraNAND Flash, the boot loader process must take control of I/O[0 . . . 7], CLE, ALE, and the system WE# signal. It is necessary, therefore, for the system to hold these signals in a tri-state condition while INIT# is asserted (low). Once INIT# goes high, indicating that the boot loader initialization is complete, the system may then drive these signals as appropriate.

Sequential Boot Code Example

Since the system address bus does not directly determine the UltraNAND Flash read address, there is no need for different PLD solutions for top boot vs. bottom boot micro-controllers. The system address decoder logic simply needs to guarantee that the UltraNAND is enabled for micro-controller code fetch following power-up and flash initialization. Included below is an example of how the system boot code could be stored in the UltraNAND Flash boot area for an x86 class micro-controller.

Once UltraNAND is initialized, the system micro-controller can begin fetching code directly out of the UltraNAND data registers, sequentially.

If the processor in the system uses a low memory address for the beginning of boot code, the boot code stored in the flash device will not cause the micro-controller to attempt to branch, or jump, either forward or backward. This ensures that there is no discontinuity between instructions read from the UltraNAND by any processor instruction prefetching logic and the actual instruction execution sequence.

If the processor uses a high memory address for the first words of boot code, the code must include a jump instruction that will change the processor address to a lower address that is still within the address range decoded by the system to select the memory 32. Without the jump instruction such a processor could increment its address to the point that it would wrap around to a low memory address that would no longer select the boot memory 32.

A jump will cause some number of bytes, from an instruction stream that is prefetched, to be discarded when the prefetch buffer is cleared by the jump. Since it may be difficult to know the exact number of bytes in the prefetch buffer that will be discarded by the jump, there should be enough NOP instructions following the jump to fill the entire prefetch buffer.

The boot code first executed directly from the UltraNAND device simply loads a more comprehensive bootstrap program from the UltraNAND device to an XIP memory resource, like SRAM or DRAM. This loading of bootstrap code can be done via a string move or through consecutive move immediate commands.

If a string move is used, the instruction stream following the string instruction must begin and end with enough NOP instructions to fill the instruction prefetch buffer of the processor used. This will ensure the code stream picked up by the string move read operation starts beyond the point at which the prefetch buffer filled. Because the exact point at which the prefetch buffer stops reading bytes from the UltraNAND, and string move operation begins reading bytes, cannot be predicted, the code loaded into the XIP memory resource may begin with some of the left over NOP instructions.

Since the exact alignment of the code may not be controlled it is important to use relative branches within the portion of the bootstrap program that is loaded into XIP memory. For processors that require tight control over the byte alignment of code, a stream of move immediate instructions may be a better approach to loading the bootstrap code into XIP memory.

Once the boot code is assembled in the XIP memory, the last instruction causes the micro-controller to jump into the boot code for execution. The example below includes an x86 boot code sequence in assembly code format which would execute sequentially out of UltraNAND, after initialization.

Definitions:

| | |
|---|---|
| SOURCE - | Memory mapped base address for the UltraNAND device. This address must cause the UltraNAND device to be selected when read. |
| DESTINATION - | The destination address for the XIP memory resource to hold the system code that was stored in UltraNAND. Once the UltraNAND memory contents are transferred to shadow memory, the last line in the boot code example jumps into the XIP area for system code execution. |
| XIP - | Segment address for the XIP memory. |
| ULTRA - | Segment address for sequential memory. |
| COUNT - | The number of bytes to transfer from the UltraNAND device to the XIP memory. This count must include the maximum number of bytes that can be prefetched. In this case 32 bytes is the prefetch buffer size of a 486 processor. |
| START - | An address for the beginning of boot code. x86.. processors start execution at F . . . FF0h, i.e. within 16 bytes of the top of memory. So, it is necessary to first jump to a lower code address within the address space that still selects the UltraNAND device. This prevents the address from wrapping around to an address space that would no longer select the UltraNAND. The actual address is not that important, since the UltraNAND device will simply deliver a sequential stream of instructions, independent of the address bus. However, the jump destination address must be far enough below the top of memory to keep the address within the UltraNAND address space until this initial bootstrap code jumps to the remaining bootstrap code that is copied to XIP memory. |
| NOP - | Fill the remaining bytes up to what would be address F . . . FFFh in a normally executing system with NOP instructions. This prevents any unexpected code execution or boundary problems that might be caused by an instruction prefetch unit reading in locations beyond the branch instruction. Some or all of these NOP instructions may be read from the UltraNAND by the prefetch unit and some will be discarded when the branch flushes the prefetch buffer. However the exact number of instructions that will be discarded from the byte stream read from the UltraNAND is unknown. By using NOP instructions the processor will just keep reading until the remaining instructions in the stream are encountered. |

Code Example:

| | |
|---|---|
| JMP START | ;Jump from the reset address to the boot code address range so that the instruction address counter will not wrap and go outside of the sequential memory address range. |
| NOP | ;Fill the next 32 bytes with NOPs to ensure the prefetch buffer will not be able to fetch any of the following instructions before the jump executes and clears the prefetch buffer |
| START: | |
| STD | ;Set direction flag to increment destination address during string move |
| MOV DS, ULTRA | ;Load the segment address for the UltraNAND memory |
| MOV ES, XIP | ;Load the Extra Segment register with the segment address for the XIP memory. |
| MOV ESI, SOURCE | ;Load the beginning UltraNAND address |
| MOV EDI, DESTINATION | ;Load the destination address to prepare for the string move |
| MOV ECX, COUNT | ;Load the number of bytes to transfer during the string move |

| | |
|---|---|
| -continued | |
| REP MOVSB | ;Move bytes from UltraNAND to shadow memory |
| NOP . . . | ;32 bytes of NOP to fill the processor prefetch buffer |
| {XIP code stream} | ;The code stream to be moved into XIP memory |
| NOP . . . | ;64 more NOP instructions are needed since the exact stopping point of the string move has to over shoot the end of code by as many NOP instructions as may have preceded the code in order to ensure that all of the code does get moved. |
| JMP DESTINATION | ;Once the transfer is done, jump to the bootstrap code in XIP memory. |

In summary, the present invention provides a computer system in which initial program execution is performed using only a sequential access memory, thereby eliminating the need for a separate non-volatile random access memory.

Various modifications will become possible for those skilled in the art after receiving the teachings of the present disclosure without departing from the scope thereof.

What is claimed is:

1. A computer system comprising:
   a processor;
   a sequential access memory for storing a boot program; and
   a boot loader for controlling the sequential access memory to read the boot program and controlling the processor so as to execute the boot program in the sequential access memory in response to initialization of the computer system, wherein the boot program is configured to control the processor to transfer boot code from the sequential access memory to a volatile Random Memory (RAM) and then jump to the boot code in the RAM.

2. A computer system as in claim 1, in which the boot loader is configured to enter a read command and an address into the sequential access memory and then control the sequential access memory to execute the read command.

3. A computer system as in claim 2, in which:
   the sequential access memory is configured to store the boot program in at least one memory page; and
   the read command causes a first memory page to be read.

4. A computer system as in claim 3, in which the read command is a gapless read command.

5. A computer system as in claim 1, in which:
   the boot loader is configured to inhibit the processor until the sequential access memory has made at least part of the boot program available for reading, and then enable the processor; and
   the processor is configured to read and execute the boot program from the sequential access memory upon being enabled.

6. A computer system as in claim 1, in which the boot loader is configured to be activated upon initialization of the computer system.

7. A computer system as in claim 1, in which the boot loader comprises a programmable logic device.

8. A computer system as in claim 1, in which the boot loader comprises a state machine.

9. A computer system as in claim 8, in which the boot loader comprises a programmable logic device in which the state machine is implemented.

10. A computer system as in claim 8, in which the state machine is configured to enter a read command and an address into the sequential access memory and then control the sequential access memory to execute the read command.

11. A computer system as in claim 1, in which the boot program is configured to control the processor to transfer boot code from the sequential access memory to a volatile Random Memory (RAM) and then jump to the boot code in the RAM.

12. A computer system as in claim 11, in which the RAM comprises a cache memory in the processor.

13. A computer system as in claim 11, in which the RAM comprises an Execute-in-Place (XIP) memory which is separate from the processor.

14. A computer system as in claim 1, in which the sequential access memory and the boot loader are implemented in a single integrated circuit.

15. A computer system as in claim 1, in which the boot program is configured to anticipate the processor's program address logic behavior so as to keep the processor address within a range of addresses that select the sequential access memory.

16. A computer system as in claim 1, in which the boot program is configured to anticipate the behavior of any code prefetching logic and ensure that necessary instructions are never prefetched and discarded by the prefetch logic.

17. A computer system as in claim 1, in which the boot program is configured to include NOP instructions as padding between sections of the code where there may be discontinuities in the code stream caused by prefetch buffer logic.

18. A computer system as in claim 1, in which:
   the boot program is configured to control the processor to transfer boot code from the sequential access memory to a volatile Random Memory (RAM) and then jump to the boot code in the RAM; and
   the boot program is further configured such that branches within the boot code in the RAM are relative.

19. A computer system as in claim 1, in which the boot program is configured to control the processor to transfer boot code from the sequential access memory to a volatile Random Memory (RAM) using move immediate instructions and then jump to the boot code in the RAM.

20. A method for initial program execution of a computer system which includes a processor and a sequential access memory, comprising the steps of:
   (a) storing a boot program in a sequential access memory;
   (b) providing a boot loader for controlling the sequential access memory to read the boot program and control the processor to jump to the boot program in the sequential access memory in response to initialization of the computer system; and
   (c) initializing the computer system, wherein the boot program is configured to control the processor to transfer boot code from the sequential access memory to a volatile Random Memory (RAM) and then jump to the boot code in the RAM.

21. A method as in claim 20, in which step (b) comprises configuring the boot loader to enter a read command and an address into the sequential access memory and then control the sequential access memory to execute the read command.

22. A method as in claim 21, in which:
   step (a) comprises configuring the sequential access memory to store the boot program in at least one memory page; and
   step (b) comprises configuring the boot loader such that the read command causes a first memory page to be read.

23. A method as in claim 22, in which the read command is a gapless read command.

24. A method as in claim 20, in which:
step (b) comprises configuring the boot loader to inhibit the processor until the sequential access memory has read at least part of the boot program, and then enable the processor; and
the processor is configured to execute the boot program in the sequential access memory upon being enabled.

25. A method as in claim 20, in which step (b) comprises configuring the boot loader to be activated upon initialization of the computer system.

26. A method as in claim 20, in which step (b) comprises configuring the boot loader to include a programmable logic device.

27. A method as in claim 20, in which step (b) comprises configuring the boot loader to include a state machine.

28. A method as in claim 27, in which step (b) comprises configuring the boot loader to include a programmable logic device in which the state machine is implemented.

29. A method as in claim 27, in which the state machine is configured to enter a read command and an address into the sequential access memory and then control the sequential access memory to execute the read command.

30. A method as in claim 20, further comprising the step of:
(d) providing a volatile Random Access memory (RAM), in which:
step (a) comprises configuring the boot program to control the processor to transfer boot code from the sequential access memory to the RAM and then jump to the boot code in the RAM.

31. A method as in claim 30, in which step (d) comprises providing the RAM to include a cache memory in the processor.

32. A method as in claim 30, in which step (d) comprises providing the RAM to include an Execute-in-Place (XIP) memory which is separate from the processor.

33. A method as in claim 20, in which step (b) comprises implementing the boot loader and the sequential access memory in a single integrated circuit.

34. A method as in claim 20, in which step (a) comprises configuring the boot program to anticipate the processor's program address logic behavior so as to keep the processor address within a range of addresses that select the sequential access memory.

35. A method as in claim 20, in which step (a) comprises configuring the boot program to anticipate the behavior of any code prefetching logic and ensure that necessary instructions are never prefetched and discarded by the prefetch logic.

36. A method as in claim 20, in which step (a) comprises configuring the boot program to include NOP instructions used as padding between sections of the code where there may be discontinuities in the code stream caused by prefetch buffer logic.

37. A method as in claim 20, in which:
step (a) comprises configuring the boot program to control the processor to transfer boot code from the sequential access memory to a volatile Random Memory (RAM) and then jump to the boot code in the RAM; and
step (a) further comprises configuring the boot program such that branches within the boot code in the RAM are relative.

38. A method as in claim 20, in which step (a) comprises configuring the boot program to control the processor to transfer boot code from the sequential access memory to a volatile Random Memory (RAM) using move immediate instructions and then jump to the boot code in the RAM.

* * * * *